April 6, 1965   C. D. MARSHALL ETAL   3,177,089

BASE COATED WITH A LINEAR THERMOPLASTIC POLYETHER

Filed April 12, 1961

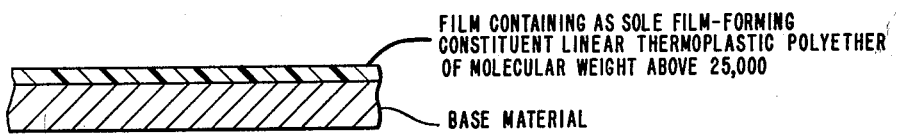

FILM CONTAINING AS SOLE FILM-FORMING CONSTITUENT LINEAR THERMOPLASTIC POLYETHER OF MOLECULAR WEIGHT ABOVE 25,000

BASE MATERIAL

FIG. 1

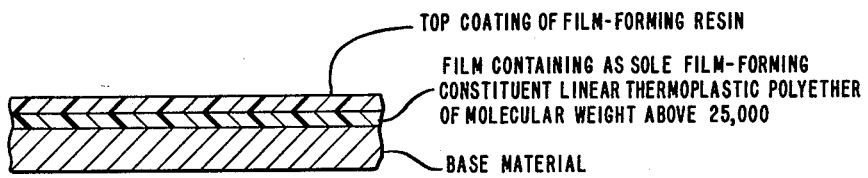

TOP COATING OF FILM-FORMING RESIN

FILM CONTAINING AS SOLE FILM-FORMING CONSTITUENT LINEAR THERMOPLASTIC POLYETHER OF MOLECULAR WEIGHT ABOVE 25,000

BASE MATERIAL

FIG. 2

INVENTORS:
CLIFFORD D. MARSHALL
PETER B. KELLY

BY: Martin S. Baer

THEIR ATTORNEY 3,177,089
BASE COATED WITH A LINEAR THERMOPLASTIC POLYETHER
Clifford D. Marshall, Houston, and Peter B. Kelly, Pasadena, Tex., assignors to Shell Oil Company, New York, N.Y., a corporation of Delaware
Filed Apr. 12, 1961, Ser. No. 102,394
8 Claims. (Cl. 117—72)

This invention relates to coatings formed from certain polyether resins.

The coatings of this invention are formed from unique polyether resins which are products of the condensation of substantially equimolar parts of di-vic-epoxides having the epoxide groups in terminal positions in the molecule and dihydric phenols; the polyether resins are characterized by a substantially linear structure, a high molecular weight and high impact resistance.

Said polyether resins, which are the basic materials used in the compositions of this invention, may be prepared from the same reactants as epoxy resins known to the art. Conventional epoxy resins are prepared by reacting polyepoxides with curing agents, the reaction resulting in opening of the epoxide rings and formation of highly cross-linked thermoset resins, herein called "cured epoxy resins." The polyepoxides which are the starting materials for the production of conventional cured epoxy resins are sometimes themselves referred to as epoxy resins and will be herein designated "uncured epoxy resins."

The polyether resins which are basic materials in the compositions of this invention are clearly distinguished from both uncured and cured epoxy resins by their physical characteristics and chemical structure. The uncured epoxy resins are characterized by a molecular weight which is lower by an order of magnitude than the molecular weight of said polyether resins. For example, the highest weight average molecular weight of polyepoxides commercially produced for conversion to epoxy resins is about 15,000, compared with weight average molecular weights of 25,000 to 1,000,000 or more for said polyether resins. The most important distinguishing factor is that uncured epoxy resins are not satisfactory for use as coatings or adhesives unless they are reacted with a curing agent, i.e., chemically changed, while the polyether resins used in the invention have excellent coating and adhesion properties without any further chemical modification.

The distinction between the polyether resins used in this invention and cured epoxy resins lies in their different chemical structure, the former being substantially linear thermoplastic resins and the latter cross-linked thermoset resins.

The polyepoxides which are the starting materials for the thermoset epoxy resins of the prior art and for the polyether resins which are used in the compositions of this invention can be made by reacting the identical monomeric materials, such as, for example, epichlorohydrin and p,p'-bisphenol A. The explanation of the difference in the resulting products of these reactions lies in the reaction conditions. The conditions for the preparation of polyepoxides usable for producing epoxy resins are well known and are illustrated for example in U.S. Patents 2,467,171 to Werner et al. and 2,651,589 to Shokal et al. The conditons for the production of the polyether resins which are the starting materials of compositions of this invention are described in detail in copending patent application Serial No. 46,387, filed August 1, 1960, by R. L. Maycock et al., now abandoned and in a continuation-in-part thereof.

Maycock et al. were concerned with the production of a resin suitable for manufacture by compression molding or extrusion into parts such as housings for radios and electronic equipment and gears for small machines and appliances, in which high impact resistance is a necessary property. It has now been found that the same resins can be converted to coatings of outstanding toughness, adhesion and abrasion resistance which have excellent hardness, flexibility and chemical resistance. These coatings are suitable for use on a great variety of base materials. A number of modifications of this invention are hereinafter described in which said polyether resins are combined with various solvents and other ingredients for the preparation of suitable protective or decorative coatings.

Particularly uncommon and advantageous properties of the coatings of this invention are their unusually high abrasion resistance, combined with great hardness, flexibility and unusually high adhesion to metals. High abrasion resistance and high hardness are an uncommon combination in coating resins. The metal adhesion of these coatings is superior to that of most, if not all, thermoplastic resins.

It is an object of this invention to provide novel surface coatings characterized by excellent adhesion, flexibility, toughness, abrasion resistance, hardness and resistance to chemicals. Another object is to provide surface coatings having many of the advantages of epoxy resins but not requiring the addition of curing agents or a curing reaction. It is another object to provide novel transparent, clear or colored, surface coatings for metals. Another object is to provide novel primers for vinyl and acrylic resin top coats. Another object is to provide metal articles coated with pigmented primer and enamel compositions. Numerous other objects of this invention will be apparent from the following description thereof.

The invention is illustrated by a drawing in which FIG. 1 represents a section through a base material coated with a coating according to this invention, comprising as sole film-forming constituent a linear thermoplastic polyether of the type described below; FIG. 2 represents a section through an article consisting of a base containing as first or primer coat a film of the same type of polyether, and as top coat a film of a film-forming resin, such as further described below.

MATERIALS UTILIZED IN THIS INVENTION

*Polyether resins*

The resins utilized in this invention are substantially linear polyether condensation products of substantially equimolar parts of dihydric phenols and diepoxides, having certain characteristic properties including high impact resistance when tested in the form of molded shapes. They can be obtained by reacting diepoxides and dihydric phenols in solutions of low water content under controlled conditions, as described in detail in copending patent application Serial No. 46,387, now abandoned, filed August 1, 1960 by R. L. Maycock et al. The methods of preparation will be referred to only to the extent required for understanding of this invention.

"Epoxide" herein refers exclusively to vicinal epoxide grouping or oxirane ring

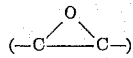

Resins suitable for use in this invention are characterized by a relatively high molecular weight. A useful measurement indicative of molecular weight of resins is "intrinsic viscosity" (I.V.). Unless otherwise indicated, all values of I.V. given herein are in units of dl./g. and are based on measurements in dimethoxyethane (DME). The polyether resins used in this invention generally have an I.V. in the range from 0.3 to 1.0. This corresponds approximately to weight average molecular weights of 50,000 to 1,000,000. A particularly preferred resin has an I.V. of 0.39, corresponding to a weight average molecular weight of about 200,000.

Particularly useful polyether resins for use in this invention are produced by the reaction of 2,2-bis(4-hydroxyphenyl)propane and the diglycidyl ether thereof, namely 2,2-bis(2,3-epoxypropoxyphenyl)propane. The phenolic compound is often referred to in industry as "p,p'-bisphenol A"; technical grades of the named compound are generally referred to simply as "bisphenol A." These terms are at times used herein for convenience of reference. Similarly, the diglycidyl compound may conveniently be designated "diglycidyl ether of p,p'-bisphenol A."

In lieu of the pure diglycidyl ether of bisphenol A, there may be used a commercial reaction product of bisphenol A and epichlorohydrin which contain about 70% to 80% of the diglycidyl ether of bisphenol A, the remainder being diepoxides which are higher condensation products. This product typically is a viscous liquid having a weight average molecular weight of about 350 and an epoxide value of 0.50 epoxide equivalent per 100 grams. Its preparation is described in U.S. 2,633,458 under "Polyether A."

Another particularly useful polyether resin is produced by reacting bisphenol A with a mixture of diepoxides produced as the condensation product of bisphenol A with epichlorohydrin, said mixture being characterized by a weight average molecular weight of about 900, a Durrans' Mercury Method melting point of about 70° C. and an epoxide value of about 0.20 epoxide equivalent per 100 grams. This is described as "Polyether D" in U.S. 2,633,458 to Shokal.

In general, preferred polyether resins are produced by reacting bisphenol A with the reaction products of epichlorohydrin and bisphenol A produced, for example, as described in said Shokal patent and having molecular weights from 340 to 2,000. This includes polyethers A through E of said patent.

The description of this invention will be made in substantial part by reference to the product prepared from bisphenol A and its diepoxide derivatives. Satisfactory results can also be obtained, however, with resins from other phenolic compounds and diepoxides, and particularly from certain other bisphenols and their diglycidyl ethers.

Starting compounds suitable for preparing the thermoplastic polyether resins used in this invention are enumerated in detail in said application of Maycock et al. Preferred phenols may be represented by the general formula

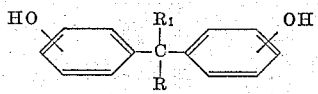

in which $R_1$ and $R_2$ when taken collectively with the connector carbon C are from the group consisting of cyclohexyl and alkyl-substituted cyclohexyl, and when taken separately are from the group consisting of hydrogen, alkyl, cyclohexyl, phenyl and alkyl-substituted cyclohexyl and phenyl groups and their halogen derivatives, with the total number of carbon atoms in the group or groups attached to said connector carbon atom not exceeding eighteen and the number of carbon atoms in any of said alkyl substituent groups not exceeding six. The preferred phenols have the hydroxyl groups in the 4,4' positions, but compounds with hydroxyls in the 2,2', 3,3', 2,4', and other arrangements may also be used. $R_1$ and $R_2$ suitably are methyl, ethyl, isobutyl, n-nonyl, n-heptadecyl and the like.

Other dihydric phenols may also be employed, excepting those which have two hydroxyl groups in ortho position on a single benzene ring.

The second reactant in the condensation process, the diepoxide, is a compound having two 1,2-epoxide groups in terminal positions in the molecule. Suitable diepoxides are terminal diepoxyalkanes, e.g., 1,2-epoxy-5,6-epoxyhexane and the like. Others are terminal diepoxides containing ether linkages, such as bis-(2,3-epoxypropyl)ether; diglycidyl ethers of alpha, omega glycols such as the diglycidyl ether of ethylene glycol; and diglycidyl ethers of dihydric phenols. Reaction products containing mixtures of related diepoxides of different molecular weights can be used.

The condensation reaction between a dihydric phenol and a diglycidyl ether of a dihydric phenol to produce the desired thermoplastic polyether resins requires the presence of a basic condensation catalyst. The catalyst may be added, for example, as a concentrated aqueous solution of sodium or potassium hydroxide or a quaternary ammonium hydroxide or it may be added as anhydrous ammonia or an amine or a sodium or ammonium salt of a phenol, e.g., of the same dihydric phenol which is used as a reactant. When the catalyst is added as an aqueous solution, a concentrated solution is used since it is not desirable to have more than a small amount of water present in the reaction mixture.

The concentration of catalyst present during the condensation reaction is held to a very low value, usually 0.04 to 0.75 percent by weight of the total reactants, and preferably between 0.08 and 0.20 weight percent. It is useful to add initially an extra amount of catalyst, sufficient to react with any impurities, such as saponifiable chlorine, to prevent slowing down of the reaction.

The water content of the reaction mixture is maintained below 1 percent by weight. While it is preferred to keep it as low as possible, concentrations below 0.5 percent by weight are generally satisfactory.

Careful control of the ratio of dihydric phenol and diglycidyl ether in the reaction mixture is of great importance in order to obtain a product having the desired characteristics. When technical grades of one or several reagents are employed, the correct ratio is maintained by determining the epoxy equivalence and the phenolic hydroxide equivalency of the reagents. Reaction mixtures should contain not less than 0.980 and not more than 1.025 vicinal epoxide groups

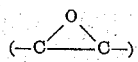

per phenolic hydroxide group.

As the linear polyethers are produced from reaction mixtures in which phenolic and epoxide groups are substantially equimolar, the resulting product consists of molecules characterized by the presence of a substantial number of terminal hydroxyl groups as well as terminal epoxy groups. A typical product, illustrated in greater detail in Example 1, below, has 0.005 eq./100 g. epoxide termination and 0.012 eq./100 g. phenolic hydroxyl termination.

The reaction is carried out in solution in a solvent or mixture of solvents which: (1) is capable of maintaining reactants and reaction products in solution, at reaction temperatures, in the concentrations employed, (2) does not react significantly with epoxide groups or phenolic hydroxyl groups, and (3) has a boiling point such that the reaction can be carried out at 75° to 150° C. at a practical pressure.

Methyl ethyl ketone is a preferred solvent. Other solvents which meet these criteria are, for example, certain other ketones, halogenated hydrocarbons and ethers, e.g., methyl isobutyl ketone, cyclohexanone, chloroform, 1,2-dichloroethane, dioxane, tetrahydrofuran, dimethoxyethane, lower alkyl (methyl or ethyl) ethers of ethylene glycol and benzyl alcohol, or mixtures of benzene with acetone.

The following describes one preferred method for producing the polyether resins used in this invention. Numerous modifications can be made in this method. A suitable solvent, e.g., methyl ethyl ketone, is placed in a reaction vessel. A dihydric phenol and a diglycidyl ether of a dihydric phenol are added in precisely measured amounts, such that the ratio of epoxide groups to phenolic hydroxide groups is in the range from 0.980:1.000 to 1.025:1.000. The concentration of the reactants in methyl ethyl ketone is preferably in the range from 20% to 60% by weight, most preferably from 35% to 45%. A basic catalyst is added to the mixture. The reaction mixture is brought to a desired reaction temperature, suitably between 75° and 150° C. and maintained at that temperature with agitation until a condensation product of a desired intrinsic viscosity has been produced.

The reaction mixture may then be diluted with solvent, cooled and washed with sufficient water to remove at least most of the salt formed in the catalyst neutralization. The washing step at this stage is not essential if the resin is subsequently recovered by precipitation in a large volume of water.

The reaction mixture may be stabilized by removing all solvent by heating under vacuum, if desired, but this step is found to be not essential. If the reaction mixture was stabilized, it is redissolved in a suitable solvent. In the production of high impact resistant resin, it is preferred to have a solution of the condensation product formed in the reaction step and to recover the resin from solution by rapid and complete removal of solvent from the resin.

In the production of resin solutions suitable for use in the present invention, the washed solution of resin and the reaction solvent may be directly employed without prior precipitation of the resin, or the resin may be precipitated and then again placed in solution in a suitable solvent.

Solvents

The above-described polyether resins are soluble in a variety of conventional solvents of relatively high polarity, i.e., those known as "strong solvents." Solutions of the resins may be prepared utilizing a single compound as solvent but are generally prepared with a mixture of solvents to provide the desired solubility for not only the resin but other ingredients of the composition and the desired volatility for the intended use. Useful solvents are selected from the group consisting of oxygen-containing and halogen-containing organic compounds and a few miscellaneous types. Suitable solvents include, for example: methyl ethyl ketone, cyclohexanone, mesityl oxide, diacetone alcohol, dioxane, dimethoxyethane, tetrahydrofuran, methyl ether of diacetone alcohol, 4-methoxy-4-methyl pentanone-2 ("Pentoxone"), diethylene glycol mono-n-butyl ether, ethylene glycol monomethyl ether (methyl "Cellosolve"), ethylene glycol monomethyl ether acetate, ethylene glycol monoethyl ether acetate ("Cellosolve" acetate), dichloromethane, chloroform, dimethylsulfoxide and dimethylformamide. Liquids which are not in themselves solvents for the polyether resins may be employed in admixture with some of the useful highly polar solvents in order to provide, for example, mutual solubility with other ingredients. For this reason, it is sometimes desirable to add to the strong solvent a hydrocarbon solvent such as an aromatic compound, e.g., toluene or xylene, or a paraffinic solvent such as a high-boiling naphtha.

The high molecular weight of the polyether resins causes them to be soluble in many instances only in higher concentrations. For example, mixtures of a preferred polyether resin and methyl ethyl ketone are homogeneous solutions at concentrations above about 22–24 percent by weight resin, but a separate resin phase is present at substantially lower resin concentrations at room temperature. In general, polyfunctional oxygenated compounds, such as ether alcohols, ether esters or ether ketones provide the broadest solubility ranges. For example, the preferred resins of this invention are soluble in all concentrations in ethylene glycol monoethyl ether acetate and in 4-methoxy-4-methyl pentanone-2. Solvent mixtures containing at least 20 percent of one of said compounds are particularly advantageous. Such solvent blends generally provide solubility to infinite dilution.

The concentration of resin in the solutions varies with intended use. Thus, concentrates suitable for shipping, storage and handling may contain 40% by weight or more of the resin or of total solids including resin. Lacquers and paint compositions typically contain 20 to 35% of the resin, together with other ingredients. They may be thinned for use to resin contents of from 5 to 20% or more.

Modifying ingredients

*Polyalkylene glycols.*—Polyalkylene glycols added to solutions of this invention used for the production of clear coatings on metal substrates prevent stress cracking. Suitable polyalkylene glycols have molecular weights in the range from 600 to 10,000. They include polyethylene glycols and polypropylene glycols. In many instances commercial plasticizers of this type are not completely identified by their chemical structure. Their suitability for inhibiting stress cracking can be readily determined by suitable test methods.

A separate useful property of polyethylene glycols in compositions of this invention is their effect on reducing the temperature at which a satisfactory coating can be obtained from the polyether resin in a dry method, such as application in a fluidized bed. The effective temperature can be reduced by as much as 200° F. by the addition of a suitable polyalkylene glycol.

These glycols are suitably added in concentrations from 5 to 40 phr. (parts per 100 parts resin).

Ingredients which are conventionally employed in thermoplastic coating and adhesive compositions may also be employed in many instances in the compositions of this invention with some beneficial effect. The following are typical of such ingredients.

*Conventional plasticizers.*—While not all conventional plasticizers are compatible with the polyether resins used in this invention, the following are typical of those which are compatible and may be added if desired: diallylphthalate, dioctylsebacate, dibutylphthalate, butylbenzylphthalate, polyvinyl formals, polyesters, chlorinated biphenyls, hydrogenated rosins, rosin esters, triaryl phosphates such as triphenyl phosphate and tricresyl phosphate, trialkyl phosphates such as tributyl phosphate, and the like. One advantage of these compounds is that they improve the rate of solvent release. This effect is particularly pronounced with chlorinated biphenyls. Suitable concentrations run from 5 to 40 phr.

*Ultraviolet screening agents.*—Ultraviolet screening agents can be suitably added to the compositions of this invention. It is found that addition of agents such as orthohydroxylbenzophenones and carbon black results in coatings which have greatly improved facility for preventing rusting on steel objects coated with such compositions. These ingredients are incorporated into the coating solution merely by stirring them into the solution. They may be present in concentrations from 0.01 to 5 phr.

*Fillers.*—Inorganic or organic extenders such as silica, titanium dioxide, wood flour, asbestos, sawdust, etc., can be added to the compositions of this invention in concentrations from 1 phr. to 1000 phr. The resulting slurries or pastes are suitable for use as sealants and fillers.

*Dyes.*—Color can be provided for the compositions of this invention either by addition of dyes or the addition of pigments. Oil soluble dyes are in general, suitable. Typical useful dyes are for example, crystal violet, alizarin and cyanine green. The dyes may be added directly or in solution to the coating solutions containing the linear resins according to this invention. The dyes have no measurable adverse effect on resin properties when used at concentrations up to 1 phr. The use of clear solutions of the polyether resin together with dyes results in beautiful decorative coatings for bright metal work. For example, aluminum coated in this manner appears much like a very glossy anodized aluminum.

*Pigments.*—The addition of pigments to solvent-containing compositions of the above-described polyethers results in a substantial improvement in the rate of solvent release from the coatings, and hence in quick establishment of strong adhesion of the resulting coating. Typical pigments suitable for use in this invention include for example red iron oxide, the various forms of titanium dioxide, lead oxide, lead chromate, zinc oxide, magnesium silicate, calcium carbonate and calcium plumbate. Zinc chromate, a desirable rust preventing ingredient, can be incorporated in the compositions of this invention whereas it is not suitable for use in pigmented compositions prepared from conventional epoxy resins because it reacts with the usually required amine curing agents. Pigments are used in concentrations which are conventional in the paint art, e.g., in ranges from 1 to 40 percent.

*Substrates for coatings.*—The coatings of this invention can be applied to a great variety of bases or substrates. Included in these are all structural metals such as steel, brass, aluminum, tin plate and the like and a variety of non-metallic surfaces such as various kinds of wood, glass, ceramics and thermoplastic and thermoset synthetic resins such as epoxy, acrylic and vinyl resins.

In order to provide an adhesive coating it is ordinarily only required that the surface be cleaned in the same manner otherwise used for the application of paints or protective coatings.

PRIMERS AND BASE COATS

The excellent adhesion of coatings according to this invention to various metallic and non-metallic substrates makes them particularly useful as bases for thin coatings of other resins and as primers for various paints. When used as bases for other resins, ordinarily thin clear coatings of the resins of this invention are applied. Thus the adhesion of the coatings of this invention to conventional resins such as epoxy, acrylic and vinyl resins is generally utilized in reverse fashion by applying those various types of resins to a coating of the resin of this invention on a substrate such as metal, glass, wood or the like. The resins of this invention are particularly suitable in the preparation of can coatings where strong adhesion to the metal surface of the can is required. A final top coat of a resin such as conventionally applied by the can manufacturer, e.g., a vinyl resin, can then be coated on the base coat prepared according to this invention.

The excellent adhesion, toughness and chemical resistance of the resins of this invention is also a particularly desirable property in primer paints for use on appliances, automobiles and the like. These primer paints are generally pigmented compositions. They will be further illustrated by specific examples.

METHODS OF APPLYING COATINGS

In the application of coatings utilizing the compositions of this invention a distinction can be made between those methods in which the coating composition contains solvents and those in which it contains only the resin itself, and possibly other modifying ingredients such as pigments, fillers, plasticizers and the like. The former will be referred to herein as wet methods and the latter as dry methods.

Dry methods

It has been found that coatings according to this invention can be successfully laid down by the following dry methods which are known to the art. In the "fluidized bed" technique the article to be coated is heated to a temperature above the melting point of the resin but below the point at which the article itself is adversely affected by temperature, and the heated article is dipped into a fluidized bed of powdered resin. The fluidization of the bed is suitably effected by a continuous stream of air distributed through the resin powder. The article is withdrawn after a predetermined period of immersion and is cooled. Films varying in thickness from 5 to above 20 mils can be applied in a single dip. The preheating temperatures required to provide the proper sintering of the resin and film flow properties depend on the type of substrate employed, the mass of the article, its heat conductivity and resin composition. It has been found to vary from a minimum temperature of about 350° F. to a maximum of about 600° F. Objects thus coated provide good electrical insulation properties and resistance to chemicals. As has been explained above, it is particularly preferred to include a suitable polyalkylene glycol in their composition to permit operation at the lower temperatures in this range.

In another dry method the powdered resin is sprayed onto a preheated substrate.

In another dry method the powdered resin is applied by flame technique, i.e., a stream of the powdered resin is applied to the article through or with a flame which heats the resin above its melting temperature.

In another dry method of application the reisn is applied by electrostatic deposition.

Wet methods

Solutions of the polyether resins can be applied as coatings in any of the conventional methods for applying such coatings, e.g., by spraying, including conventional hot, warm, airless, steam, and electrostatic spraying, by brushing, dipping or flow methods. Any of these may be either cold, warm or hot.

Solutions of the polyether resin can be emulsified and applied by the same conventional methods as referred to in connection with solution coatings.

In a further modification the coatings of resins according to this invention may be applied by preparing the reisn in the form of a plastisol or of an organosol.

Coatings prepared by any wet method may be air dried at ambient temperatures, force dried at moderately elevated temperatures, or baked at relatively high elevated temperatures, e.g., up to 500° F. Drying time and temperature are interchangeable variables to some extent. Improvements in coating properties as air drying time is increased from 2 to 24 hours are illustrated in Example 6. A typical air drying time at room temperature for a coating on a wooden substrate, is 72 hours, as illustrated in Example 15.

Typical force drying conditions, illustrated in Example 11, comprise drying at 350° F. for 30 minutes in a stream of air.

The invention will be further illustrated by means of the following examples which show typical formulations and methods of preparation of coatings according to this invention, as well as their properties. These examples are only for the purpose of furnishing a better understanding of this invention and of showing preferred embodiments thereof and are not to be considered a limitation of this invention. Unless otherwise indicated, parts and percentages are by weight.

EXAMPLE 1

Polyepoxide resin is prepared as follows: To methyl ethyl ketone in a stainless steel kettle one adds a sufficient amount of a commercial grade of bisphenol A and of a commercial grade of condensation product of epichlorohydrin and bisphenol A, containing 70 to 80% of the diglycidyl ether of p,p'-bisphenol A, to produce a 40% by weight solution of reactants. The ratio of the reactants is 1.0:1.0 epoxide to phenolic hydroxyl equivalent. Catalyst is 0.02 mol of sodium hydroxide per mol of bisphenol A, added as a 45% w. aqueous solution. The reaction is carried out at 120° C. and terminated by addition of excess carbon dioxide after the desired viscosity is attained. The crude product solution is washed twice with one half volume of methyl ethyl ketone saturated with water, serving to reduce the sodium hydroxide content of the resin below 0.1 milliequivalent per 100 grams resin. The resin is recovered from solution by precipitation with cold water under rapid agitation. After centrifuging to remove excess water, the wet resin shreds are dried in a forced draft oven at 80–90° C. for at least 24 hours. In a typical preparation according to this method, the resin product properties shown in Table 1 are observed:

Table 1

| | |
|---|---|
| Intrinsic viscosity | 0.37 |
| Epoxide, eq./100 g. | 0.005 |
| Phenolic hydroxyl, eq./100 g. | 0.012 |
| Alkalinity, meq./100 g. | 0.04 |
| Secondary hydroxyl, eq./100 g. | 0.33 |
| Methyl ethyl ketone, percent w. | 0.08 |
| Water, percent w. | 0.8 |
| Total chlorine, percent w. | 0.03 |
| Inorganic chloride, percent w. | 0.0035 |
| Ash, percent w. | 0.02 |
| Heat distortion temperature (264 p.s.i.), ° C. | 89 |
| Vicat softening point, ° C. | 100 |
| Impact strength, notched Izod, ft.-lb./in. notch (average) | 1.4 |
| Impact strength, unnotched Izod, ft.-lb./in. (average) | 93 |

The chemical resistance of a series of specimens prepared from a resin prepared in this manner is tested by immersing molded discs, 0.125 inch thick and two inches in diameter, in various solvents and reagents for seven days at 25° C. (ASTM method D545–56T). The samples exhibit excellent resistance toward caustic soda, acids and some solvents. No chemical degradation is observed in any of the tests; however, in some instances swelling is found. The data are summarized as follows:

Excellent resistance (no change in thickness or width; weight gain less than 0.4%):
Sulfuric Acid (10 and 30% w.)
Nitric Acid (10% w.)
Sodium hydroxide (3 and 10% w.)
Sodium chloride (10% w.)
Hydrogen peroxide (8% w.)
Ethanol (50% vol.)
Carbon tetrachloride
Heptane Fair resistance (weight, width, and thickness gain, each less than 5%):
Ethanol (95%)    Phenol (5%)

Poor resistance (5–10% gain in weight): Toluene.

No resistance (physical structure of disc destroyed):
Acetone    Ethylene chloride

EXAMPLE 2

A solution which serves as a concentrate for the preparation of various clear and pigmented coatings is prepared by dissolving dried, shredded resin of Example 1 in methyl ethyl ketone to produce a solution containing 40% solids. The properties shown in Table 2 are typical of such a solution.

Table 2

| | |
|---|---|
| Solution viscosity at 25° C. _____poises__ | 200 |
| Solution color, Gardner | 2 |
| Solution weight per gallon _____pounds__ | 7.75 |

EXAMPLE 3

A formulation which is particularly advantageous for preparation of various lacquers and paints is prepared by adding to 50 parts of the solution of Example 2, 60 parts of ethylene glycol mono-ethyl ether acetate and 10 parts of toluene. The resulting solution then has the composition shown in Table 3.

Table 3

| | Parts |
|---|---|
| Polyether resin | 20 |
| Methyl ethyl ketone | 30 |
| Ethylene glycol monoethyl ether acetate | 60 |
| Toluene | 10 |
| | 120 |

A solvent blend consisting of the same proportions of the three solvents is suitable for use as a thinner for such compositions. Satisfactory coatings are prepared by applying a resin solution having the above formulation to a suitably clean substrate and drying it by air drying at room temperature, by force drying at moderately elevated temperatures or by baking at relatively high temperatures.

EXAMPLE 4

Another formulation can be prepared by adding to 50 parts of the resin solution of Example 2 ethylene glycol monoethyl ether acetate, methyl isobutyl carbinol and toluene to produce a solution having the composition shown in Table 4.

Table 4

| | Parts |
|---|---|
| Polyether resin | 20 |
| Methyl ethyl ketone | 30 |
| Ethylene glycol monoethyl ether acetate | 20 |
| Methyl isobutyl carbinol | 20 |
| Toluene | 30 |
| | 120 |

For these solutions, thinner suitably is made with the same preparation of solvents. These solutions also are suitable for preparing air dried, force dried or baked coatings.

EXAMPLE 5

A solution suitable for preparation of clear coatings is prepared by diluting 120 parts of the resin solution of Example 3 with 80 parts of the thinner composition of Example 3.

Typical properties of the solution and of coatings prepared therefrom are shown in Table 5.

Table 5

| | |
|---|---|
| Solution viscosity, Sec. No. 4 Ford Cup at 25° C. | 14 |
| Coating properties: | |
| Hardness, Sward after 2 hr. air drying (room temp.) | 9 |
| Hardness, Sward, after 4 hrs. air drying (room temp.) | 13 |
| Hardness, Sward, after 24 hrs. air drying (room temp.) | 18 |
| Resistance to water after 24 hrs. contact | No effect |
| Resistance to 1% detergent solution after 24 hrs. contact | No effect |
| Resistance to 10% NaOH solution after 24 hrs. contact | No effect |

Coatings prepared by applying the composition of this example to cold rolled steel and force drying possess excellent adhesion, flexibility and abrasion resistance, and good film gloss, hardness and impact resistance. They are resistant to humidity, water, hydrocarbon solvents, 10% HCl, 10% $HNO_3$, 30% $H_2SO_4$ and 60% $H_2SO_4$.

EXAMPLE 6

Solutions suitable for the preparation of clear coatings are prepared from the solution and thinner of Example 4 with addition of a variety of modifying compounds. The compositions of the solids and solvent components of these solutions and properties of the solutions and air dried coatings thereof are shown in Table 6.

Table 6
CLEAR SOLUTION TYPE COATINGS CONTAINING POLYETHER RESIN AND NON-REACTIVE MODIFIERS

| Solids Composition, percent wt.: | | | | |
|---|---|---|---|---|
| Polyether resin | 90 | 90 | 90 | 50 |
| Hydrogenated Rosin | 10 | | | |
| Butyl benzyl phthalate | | 10 | | |
| Rosin ester of pentaerythritol | | | 10 | |
| Polyester | | | | 25 |
| Triphenyl phosphate | | | | 25 |
| | 100 | 100 | 100 | 100 |
| Solvent Composition, percent wt.: | | | | |
| Methyl ethyl ketone | 30 | 30 | 30 | 30 |
| Ethylene Glycol monoethyl ether acetate | 20 | 20 | 20 | 20 |
| Methyl isobutyl carbinol | 20 | 20 | 20 | 20 |
| Toluene | 30 | 30 | 30 | 30 |
| | 100 | 100 | 100 | 100 |
| Solution Properties: | | | | |
| Solids concentration, percent wt. non-vol. | 9.7 | 12.4 | 11.5 | 17.2 |
| Viscosity, Sec. No. 4 Ford Cup at 25° C | 13.7 | 15.2 | 13.9 | 12.9 |
| Physical Properties of Coatings Hardness, Sward, after air dry: | | | | |
| 2 hr | 8 | 4 | 7 | 4 |
| 4 hr | 11 | 5 | 11 | 9 |
| 24 hr | 24 | 14 | 18 | 15 |

EXAMPLE 7

A pigmented composition which has outstanding properties and is suitable for use as a primer under conventional thermosetting and thermoplastic coatings, e.g., as an automobile primer, has the following composition and properties shown in Table 7.

Table 7
PRIMER FORMULATION (SPRAY VISCOSITY)

| | Percent |
|---|---|
| Red iron oxide | 5.3 |
| ASP 400 | 4.3 |
| Asbestine 3X | 4.3 |
| Sparmite | 7.5 |
| Aluminum stearate 907 | 0.4 |
| Polyether resin | 9.1 |
| Methyl ethyl ketone | 7.0 |
| Toluene | 20.7 |
| Cellosolve acetate | 41.4 |
| | 100.0 |

P/B=2.5/1 by weight.
Spray viscosity=18–20 seconds/No. 4 Ford Cup.
Substrate=Bonderite 100.
Film thickness=1 mil.
Baking schedule=30′/250° F.
Topcoat system=commercial white acrylic lacquer.
Spray viscosity=13.5 seconds/No. 4 Ford Cup.
Film thickness=2–2.5 mils.
Baking schedule=30′/250° F.

The primer described above exhibits outstanding adhesion and intercoat adhesion properties as compared to conventional commercially available auto primers. This superior adhesion manifests itself under many varied test conditions of which the following may be cited as representative:

1, 3 and 10 days' room temperature aging
Double bake at 30′/250° F.
Accelerated aging at 158° F. for 10 days
30 days in aerated water at 120° F.
750 hours of humidity exposure
Chip resistance at both 75 and 90 p.s.i.
Cold check resistance

EXAMPLE 8

Another typical satisfactory primary composition is shown in Table 8. This also provides a suitable base for conventional vinyl and acrylic coatings.

Table 8

| | Percent |
|---|---|
| Red iron oxide | 12.9 |
| Zinc chromate | 2.6 |
| Asbestine 3X | 9.8 |
| Polyether resin | 31.1 |
| Nuosperse 657 | >.25 |
| Cellosolve acetate | 37.1 |
| Toluene | 6.2 |
| | 100.0 |

EXAMPLE 9

Other useful primer compositions are shown in Table 9.

Table 9
TYPICAL PRIMER FORMULATIONS

| Base Primer Composition, parts by wt. | I | II |
|---|---|---|
| Pigment: | | |
| Red Iron Oxide | 125.0 | 114.5 |
| Zinc Chromate | | 23.1 |
| China Clay | 100.0 | |
| Magnesium Silicate | 100.0 | 87.5 |
| Barytes | 175.0 | |
| Vehicle: Polyether resin | 167.0 | 74.8 |
| Solvent: | | |
| Methyl Ethyl Ketone | 250.5 | 112.2 |
| Ethylene glycol monoethyl ether acetate | 166.0 | 50.0 |
| Toluene | 250.5 | 87.9 |
| Methyl isobutyl carbinol | | 50.0 |
| | 1,334.0 | 600.0 |
| Percent Non-Volatile | 50 | 50 |
| Viscosity, Sec. No. 4 Ford Cup at 25° C reduced to 40% NV | 28 | 132 |
| Pigment/Binder ratio | 3/1 | 3/1 |

Aluminum stearate or similar material may be added to the above formulations if necessary, to keep pigment in suspension.

EXAMPLE 10

A typical satisfactory white enamel composition according to this invention is shown in Table 10.

Table 10

| | Percent weight |
|---|---|
| Titanium dioxide | 10.4 |
| Polyether resin | 25.8 |
| Nuosperse 657 | 0.1 |
| Cellosolve acetate | 47.5 |
| Methyl ethyl ketone | 8.3 |
| Toluene | 7.9 |
| | 100.0 |

EXAMPLE 11

Another useful white enamel formulation is shown in Table 11.

Table 11
TYPICAL WHITE FORMULATION

| | Parts |
|---|---|
| Base white formulation: | |
| Pigment—Rutile TiO$_2$ | 140.0 |
| Vehicle—Polyether resin | 70.0 |
| Solvent— | |
| Methyl ethyl ketone | 105.0 |
| Ethylene glycol monoethyl ether acetate | 90.0 |
| Methyl isobutyl carbinol | 90.0 |
| Toluene | 105.0 |
| | 600.0 |
| Percent non-volatile | 35.0 |
| Pigment/binder ratio | 2/1 |
| Viscosity, secs. No. 4 Ford Cup at 25° C. | 23.7 |

The above formulation when reduced for application with a thinner and applied to bonderized steel and force dried for 30 minutes at 350° F. displays outstanding adhesion. Similar adhesion is obtained over a primer.

EXAMPLE 12

The resin preparation of Example 1 is repeated with the following diphenols and diepoxides.

(a) Bis(4-hydroxyphenyl)methylphenylmethane and diglycidyl ether of bisphenol A;
(b) Bis(4-hydroxyphenyl)methylphenylmethane and the diglycidyl ether thereof;
(c) Bisphenol A and bis(2,3-epoxypropoxyphenyl)methylphenylmethane;
(d) Bis(4-hydroxyphenyl)methane and diglycidyl ether of bisphenol A;
(e) 1,1-bis(4-hydroxyphenyl)ethane and diglycidyl ether of bisphenol A;
(f) 2,2-bis(4-hydroxyphenyl)butane and diglycidyl ether of bisphenol A;
(g) Bis(4-hydroxyphenyl)diphenylmethane and diglycidyl ether of bisphenol A;
(h) Bisphenol A and diepoxybutane;
(i) Bisphenol A and 1,2-epoxy-7,8-epoxyoctane;
(j) Bisphenol A and diglycidyl ether of ethylene glycol.

Solutions are prepared from the resulting reaction products in accordance with Example 2, and these solutions are blended with solvents according to Examples 3 and 4, to produce compositions suitable for use in preparing coatings as illustrated in Examples 5–10. Useful coatings are prepared from these compositions by the illustrated methods.

EXAMPLE 13

Surface coatings on metal test strips are prepared from a solution according to Example 5, but having added thereto 20 phr. and 25 phr. of a commercial polyalkylene glycol believed to be a polpropylene glycol having a molecular weight of about 10,000. The metal strips are stressed and observed. No stress cracking is found to develop in 2 months, while strips coated with a coating of similar thickness of a similar composition containing no modifiers developed stress cracks within 2 days.

Similar freedom from stress cracking is observed when polyethylene glycols of molecular weights of about 600 and about 1000 are separately used in 25 phr. concentration.

EXAMPLE 14

To illustrate the superior abrasion resistance of the polyether resins used in this invention, the following data were obtained on molded specimens of the polyethers and of some conventional resins. The tests were made on 4 x 4 x 1/8-inch compression-molded specimens using the Taber Abraser Model 174 with CS-17 wheel, 1,000 g. load. Data are tabulated in Table 12.

*Table 12*

| Thermoplastic resin: | Taber abrasion resistance Weight loss, mg./1000 cycles |
|---|---|
| Polyther resin [1] | 29 |
| Polyether resin [1] | 23 |
| Polyether resin [2] | 26 |
| Polystyrene, high impact | 82 |
| Plexiglas (polymethylmethacrylate) | 33 |
| Penton (chlorinated polyether) | 24 |
| Lexan (polycarbonate) | 24 |

[1] Product of bisphenol A and diglycidyl ether of bisphenol A.
[2] Product of bisphenol of acetophenone and glycidyl ether of bisphenol A.

EXAMPLE 15

Coatings of the polyether of Example 1 and of several commercial finishes are applied to fir plywood sheets and their abrasion resistance tested. The panels are prepared by brushing two coats of 25% w. resin in 1:1 methyl ethyl ketone-Cellosolve acetate onto the panels. The dry schedule is 72 hours at ambient temperature between applications and prior to testing. The abrasion resistance is then measured and compared with that of similarly prepared coatings of floor varnish and spar varnish. The results are shown below:

*Taber abrasion resistances*

| Resin: | Mg. lost/1,000 revolutions of CS–10 wheel at 1 kg. loading |
|---|---|
| Polyether resin | 18 |
| Spar Varnish [1] | 77 |
| Floor Varnish [2] | 134 |

[1] Pittsburgh Plate Glass Co., VD 4558.
[2] Pittsburgh Plate Glass Co., VD 4557.

These data indicate that the polyester resin (intrinsic viscosity 0.37) is markedly superior to the other coatings in abrasion resistance.

EXAMPLE 16

Films of the resin of Example 1, modified with 0.25 and 1 phr. of various UV absorbers, are applied to steel substrates in 1 mil thickness; a scratch is made in each film and it is then exposed to outdoor weather exposure. During seven weeks of exposure, some protection against subcoat rust is provided by phenyl salicylate, dibenzoyl resorcinol, and alkylated 2-hydroxyphenyl benzotriazole. The best protection is provided by orthohydroxylbenzophenones.

We claim as our invention:

1. A base coated with a tough, continuous, strongly adhering film containing as sole film-forming constituent a substantially linear thermoplastic polyether reaction product of substantially equimolar parts of a terminal di-vic-epoxide and dihydric phenol, characterized by a substantial excess of nonepoxy end-groups over epoxy end-groups, a weight average molecular weight above 25,000, and complete solubility in ethylene glycol monoethylether acetate.

2. A coated base according to claim 1 wherein said polyether is the condensation product of 2,2-bis(4-hydroxyphenyl)propane and a reaction product of 2,2-bis-(4-hydroxyphenyl) propane and epichlorohydrin, having a number average molecular weight in the range from 340 to 2000.

3. An article according to claim 2, wherein said base is a metal and said film consists of said polyether and from 5 to 40 parts, by weight, per 100 parts of said polyether, of a polyalkylene glycol having a molecular weight in the range from 600 to 10,000.

4. An article according to claim 2, wherein said film consists of said polyether and inorganic pigment.

5. An article according to claim 2 in which said base is a metal.

6. An article according to claim 2 in which said base is wood.

7. A composite article comprising a base, a tough, continuous, strongly adhering primer coating on said base containing as sole film-forming constituent a substantially linear thermoplastic polyether reaction product of substantially equimolar parts of a terminal di-vic-epoxide and a dihydric phenol, characterized by a substantial excess of non-epoxy end groups over epoxy end groups, a weight average molecular weight above 25,000, and complete solubility in ethylene glycol monoethylether acetate, and a top coating of a different film-forming resin.

8. An article according to claim 7 wherein said polyether is a condensation product of 2,2-bis(4-hydroxyphenyl)propane and a reaction product of 2,2-bis(4-hydroxyphenyl)propane and epichlorohydrin having a number average molecular weight in the range from 340 to 2,000.

(References on following page)

References Cited by the Examiner

UNITED STATES PATENTS

| | | | |
|---|---|---|---|
| 2,592,560 | 4/52 | Greenlee | 260—47 |
| 2,602,075 | 7/52 | Carpenter | 260—47 |
| 2,615,008 | 10/52 | Greenlee | 260—47 |
| 2,830,721 | 4/58 | Pinsky et al. | 260—47 |
| 2,847,323 | 8/58 | Evans et al. | 117—72 XR |
| 2,955,055 | 10/60 | Souder et al. | 117—75 |
| 2,997,776 | 8/61 | Matter et al. | 117—21 XR |
| 3,008,848 | 11/61 | Annonio | 117—75 XR |
| 3,017,302 | 1/62 | Hultkrans | 156—244 XR |
| 3,024,147 | 3/62 | Brooks et al. | 156—244 XR |
| 3,057,746 | 10/62 | Edmonds | 117—75 XR |

OTHER REFERENCES

"Paint Manufacturer," vol. 26, No. 5, May 1956, pp. 151–158.

WILLIAM D. MARTIN, *Primary Examiner.*

RICHARD D. NEVIUS, *Examiner.*